Patented Dec. 21, 1948

2,457,063

UNITED STATES PATENT OFFICE 2,457,063

DEHYDRATED MEAT SCRAPPLE AND METHOD OF MAKING THE SAME

Agnes Fay Morgan, Berkeley, Calif., and Betty M. Watts, Pullman, Wash., assignors to the United States of America as represented by the Secretary of War No Drawing. Application December 5, 1944, Serial No. 566,774

9 Claims. (Cl. 99—208)

This invention relates to food products, and more particularly, to dehydrated meat products of the type known as scrapple and a method of preparing the same.

"Scrapple" is a comminuted meat and ground cereal product, and is particularly characterized by its being made into a thick viscous mass prior to shaping. The meat ingredient of scrapple is usually, but not necessarily, pork; see Webster's New International Dictionary, 2d Ed., page 2246, and Von Loesecke, "Outline of Food Technology," 1942, page 210, wherein scrapple is defined as "a product consisting of meat and/or meat by-products mixed with meal or the flour of grain and cooked with seasoning materials, after which it is poured into a mold." Conventional scrapple mixes and methods for preparing scrapple may be found, for instance, in the Encyclopedia of Food, published by A. Ward, 1923, pages 466–467, and in Part 3 of the Packers' Encyclopedia, Sausages and Meat Specialties, 1938, pages 231 and 239. The use of meats other than pork in scrapple is described at the end of an article by Carl, Watts and Morgan, "Dehydration of Meat Scrapples" (beef scrapple, lamp scrapple, chicken scrapple), in Food Research, 1944, vol. 9, No. 4, pages 319 to 327.

It has long been sought to produce food products posessing keeping qualities and retention of palatability, adapted for long periods of storage under exceptionally adverse conditions of temperature and humidity such as those prevailing in tropical localities in the absence of adequate refrigeration facilities.

Many attempts to provide such food products have met with failure, particularly in the case of products having a high fat content, such foods being especially subject to loss of palatability and rapid development of rancidity. Further difficulties have been encountered in attempts to provide food products retaining nutritive values and concentrations of essential components, such as vitamins, comparing favorably with those found in freshly prepared foods. These difficulties have arisen especially in connection with canned and dehydrated food products because such products form a large proportion of all foods adapted to be stored for protracted periods, and it is in such foods that large losses in vitamin content, nutritive value and palatability occur due to the methods used in their preparation. Meat products are particularly subject to loss of flavor, rapid development of rancidity and general deterioration under adverse storage conditions. Another disadvantage found in dehydrated foods prepared by the usual methods is that their reconstitution, when desired for use, has been unsatisfactory, requiring long periods of soaking and cooking and resulting in food poor in flavor, consistency, and palatability as compared with a freshly-made product.

Objects of this invention are to provide food products, especially dehydrated meat products, and a process for making the same which will obviate the above-mentioned disadvantages. Further objects are to provide dehydrated meat products possessing improved keeping qualities such as high retention of essential vitamin components, high nutritive value, increased resistance to rancidity and retention of palatability. A further object is the provision of dehydrated meat products in an attractive and palatable form for eating in the dehydrated condition, and which may be rapidly rehydrated without the long soaking period commonly associated with the use of dehydrated foods. A still further object is the provision of dehydrated meat products of augmented vitamin content and nutritive value which when rehydrated will possess vitamin content and nutritive value favorably comparable to that of a freshly prepared product.

The invention consists of the products and method of preparation of the same described in detail in the specification which follows, and particularly pointed out in the claims.

It has been discovered that certain cereals possess the property of acting as antioxidants or preservatives when incorporated in food products. Such cereals, used in substantial proportions in meat products, serve to retard the development of rancidity or undesirable changes in flavor. They also serve to maintain the vitamin content of the product at a point where it compares favorably with that of a freshly prepared product and, in some instances, substantially augment the vitamin content of the food. It has also been discovered that the antioxidant or rancidity inhibiting effect of certain cereals can be greatly augmented and increased by mixing them with other cereals or legumes possessing the same properties in a greater degree or by adding other antioxidant substances.

The addition of small amounts of certain vitamin materials possessing antioxidative properties, such as ascorbic acid (vitamin C) and the tocopherols (vitamin E) to such cereals, when used in a mixture with other food, has been found not only to augment the vitamin content of the finished food product, but also to greatly increase the resistance to oxidative rancidity, maintain the palatability, and add to the nutritive value of the same.

Corn meal has an antioxidant, rancidity inhibiting effect upon meat products and its presence, alone, in substantial proportions, is sufficient to delay for a substantial period of time the development of rancidity in a product of the characteristics contemplated by the invention. Meat products having a substantial content of corn meal have been found to keep free from rancidity and other undesirable changes for much longer periods of time than the dehydrated ground meat alone. Dehydrated ground pork, for example, has been found to be of low keeping quality, rapidly becoming very poor in flavor and developing a high rancidity. A dehydrated product prepared from ground pork and corn meal, on the other hand, has very high keeping qualities and can be stored for months without becoming rancid. Such dehydrated meat products also retain much more fat than does dehydrated ground pork and have been found more acceptable as a food than the latter. A mixture of corn meal and soy flour has also been found to impart especially good keeping qualities to meat products in which it is incorporated.

A dehydrated meat product, made in accordance with the invention, may be prepared from ground meat, water, cereal, a substance having antioxidant or rancidity inhibiting properties and suitable condiments.

Any desired meat can be used, but such meats as pork, beef, lamb and chicken are preferred, and pork has been found to give an especially desirable product. The meat selected may be fat or lean and may contain any properties of fat, but a meat having a fat content between 10% and 20% is preferable. Meat having a fat content between 15% and 18% has been found to give a final product having the most desirable characteristics.

The meat is comminuted in any suitable manner to any desired degree of fineness, being preferably ground twice with a grinder having openings from 1/4 to 3/8" in diameter, but a finer or coarser grind can be used, depending upon the kind of meat selected.

The cereal employed in the product can be any of a wide variety of cereals such as, for example, corn, wheat, rice, or oats, or admixture of any of such cereals. Corn meal alone has been found to provide a desirable product and a mixture of corn meal and soy flour produces a product, having exceptionally high keeping qualities and texture.

An important factor in the preparation of the product has been found to be the coarseness of the grind of the cereal used. A too finely ground cereal, for example, provides a product having less desirable dehydration and rehydration characteristics, and a too coarsely ground cereal renders the product undesirably soft and crumbly. The coarseness of the grind of the cereal also affects the amount of water required to make a product of the most desirable consistency, a finely ground cereal requiring the addition of more water than does a coarsely ground one. When corn meal is used, it is preferably ground to a fineness such that it will pass through a sieve having openings 2 millimeters in diameter, but not through a sieve having openings 0.5 millimeter in diameter, but finer ground corn meal can, of course, be used, such as that known as "Polenta" grind. The most desirable corn meal for use in a product of this character has been found to contain the following proportions of particles as measured by sieving.

| U. S. Standard Sieve No. | Diameter of Opening in MM. | Percent by Weight of Corn Meal |
|---|---|---|
| (Round Hole) | 1.0 | 47 |
| (Round Hole) | 0.5 | 46 |
| 60 | 0.25 | 4 |
| 140 | 0.105 | 3 |
| 300 | 0.048 | 0 |

In addition to the cereals mentioned, legumes can also be used alone or in admixture with other legumes or cereals. Soy beans have been found very effective when used in this way, and when so used, may be ground only fine enough to pass through a sieve of 16 meshes to an inch or may be ground very fine as in soy flour, and are preferably used in the latter condition.

The nutritive value of the finished product can be greatly increased by a judicious selection and combining of the cereals employed. Thus, it has been found that soy bean flour, wheat germ, wheat hearts or wheat middlings can be substituted in whole or in part for corn meal, which has been the principle material used because of its cheapness and other desirable characteristics. The use of 10% wheat germ, for example, results in a product having greatly increased nutritive characteristics. It has also been found that a highly nutritious dehydrated chicken product can be made using cracked wheat as the principle cereal with an addition of wheat germ.

The antitoxidant or preservative substance used may be selected from a large number of such substances available. Corn meal, alone, as has already been pointed out, has a well defined preservative effect upon meat products, maintaining their palatability and delaying for long periods of time the development of rancidity. Among the many substances suitable for such use as antioxidants, soy flour, gum guaiac, avenex (oat flour), rice bran concentrate, tocopherols and ascorbic acid have been found especially effective. The antioxidant properties of each of these substances appears to be different, so that the effectiveness of a cheaper or more abundant material can readily be increased by admixture therewith of another material possessing antioxidant properties in a greater degree. Thus, for example, the effectiveness of corn meal as the preservative material can be greatly augmented by suitable enrichment with soy flour. Similarly, mixtures of tocopherols with ascorbic acid or tocopherols with soy bean flour have been found to possess effective antioxidant and vitamin-enriching properties when exhibited in admixture with scrapple foods.

The amounts of the antioxidants which must be present for effective preserving action differs and varies within wide limits for each individual antioxidant substance. It has been found preferable, however, to use them in about the following concentrations, expressed as percentages of the weight of the meat used in making the product: gum guaiac, 0.05%; avenex (oat flour), 5% rice bran concentrate, 0.5%; tocopherols, 0.02%, with ascorbic acid, 0.05%; tocopherols, 0.02%, with soy flour, 1.5%. The gum guaiac has been found to impart an undesirable flavor to meat products when employed in high concentrations, and for that reason when it is used, it is desirable to keep the concentration as low as possible, consistent with the maintenance of a high keeping quality.

The mixture of tocopherols with ascorbic acid and soy flour present the added advantage of fortifying and augmenting the natural vitamin content of the meat product, thus substantially enriching the food as well as preserving it.

In order to illustrate the proportions of ingredients which will produce a dehydrated meat product of a preferred type in accordance with the invention, products made from the following ingredients in the ranges of proportions given here have been found to possess the desired characteristics in a high degree:

|  | Grams |
|---|---|
| Ground lean meat | 423 to 483 |
| Water | 260 to 380 |
| Corn meal | 57 to 77 |
| Pepper | 0.1 |

It can readily be seen from what has been said above that the proportions of the ingredients may vary considerably and the resulting product will still retain substantially all of its desirable characteristics. An especially desirable product has been prepared from the following ingredients in the proportions named:

|  | Grams |
|---|---|
| Ground lean pork | 453 |
| Water | 260 |
| Polenta grind corn meal | 67 |
| Salt | .7 |
| Pepper | 0.1 |
| Full fat soy flour | 22.5 |

As a further example of a product made in accordance with the invention, a dehydrated chicken product made from the ingredients named below in the proportions given has been found to possess high palatability, resistance to rancidity and rehydration characteristics:

|  | Grams |
|---|---|
| Cooked ground chicken | 454 |
| Cracked wheat | 34 |
| Chicken broth and water | 320 |
| Wheat germ | 22.5 |

The ingredients in the proportions mentioned above are prepared by the process about to be described:

The soybean flour is added to the ground raw meat and after thorough incorporation the mixture is preheated, by steam or from any other suitable source of heat at the temperature of steam, for a period of time which may be as long as 30 minutes; a preheating time of 15 minutes or until the pink color of the mixture is gone, is considered preferable. However, the foregoing preheating step may be omitted altogether.

The mixture thus prepared is then placed over a direct flame, and water is added. When this has been brought to a boil, the corn meal and seasonings are added gradually with vigorous stirring.

The mixture so produced is again brought to a boil and due to the incorporation of the corn meal rapidly begins to thicken. After thickening has begun, the mass is heated, by steam or by any other suitable source of heat at the temperature of steam for a period which may be as long as two hours, the preferred heating time at this stage of the process being about 30 minutes, but a longer time is permissible without endangering the consistency or quality of the finished product.

The cooked product is poured while hot into suitable pans, those known as "loaf" pans being preferred because of their convenient shape, and permitted to cool and become firm. The cold "loaves" are cut into slices or other convenient shaped pieces for dehydration. Slices of a thickness of 1/16 to 3/8 inch have been found to be most satisfactory for dehydration. In order to assure uniformity of drying and moisture content in the dehydrated slices, as well as for convenience in handling, it is preferable to cut all slices to a thickness of about 1/4 inch.

A satisfactory dehydrated product results from drying the slices at temperatures of 140° F. to 160° F. for a time varying from five to twelve hours. The dehydration period will vary for products of different composition and those treated by somewhat different methods. Most of the products will, however, be adequately dehydrated when dried for about seven hours at a temperature of about 155° F. The dehydrated product may have a moisture content varying from 3% to 10%, but for best keeping quality and rehydration characteristics, it is preferred to keep the moisture content between 5% and 7%.

The product which has been formed at this stage of the process is complete and satisfactory in every way and is ready for packing and storing without the necessity of any further treatment. The density of the product may, however, be desirably increased by a compression treatment. The treatment consists of compressing the slices at a temperature of about 120° F. for 30 to 60 seconds at a pressure of about 700 pounds per square inch. The pressure used, the temperature of the slices, and the duration of the compression may, of course, vary considerably without adversely affecting the product. Too high a pressure, however, has the effect of giving an undesirable hardness to the slices and retarding their rehydration. The pressure of 700 pounds per square inch, at a temperature of 120° F. for a time of 30 seconds has been found the most suitable. The slices are preferably rehydrated somewhat before compression.

The dehydrated product thus prepared forms an attractive and palatable article of food which may be eaten just as it is in dehydrated form. The slices are easily and quickly rehydrated by soaking in water for from 15 to 30 minutes. So reconstituted, they may be fried in the usual manner in which scrapple is prepared, beaten and shaped into balls for deep fat frying, used in a gravy as a creamed meat dish, or prepared in any other manner which suits the taste.

It will thus be apparent that the invention provides a dehydrated meat product, filling a long felt want and possessing properties suiting it for storage under adverse climatic conditions for long periods of time.

Having thus clearly described the invention, what is claimed and desired to secure by Letters Patent is:

1. A scrapple food product comprising a dehydrated mixture of comminuted meat normally subject to oxidative change, cereal meal capable of passing through a sieve having openings of 2 mm. diameter and incapable of passing through a sieve having openings of 0.5 mm. diameter, and in an amount less than said cereal meal an antioxidative substance substantially uniformly distributed through said mixture, said substance being selected from soybean flour, ascorbic acid and tocopherol, whereby a non-crumbly rehydratable, dehydrated, rancidity-inhibited scrapple food product is provided.

2. A scrapple food product comprising a dehydrated mixture of comminuted meat normally subject to oxidative change, cereal meal capable of passing through a sieve having openings of 2 mm. diameter and incapable of passing through a sieve having openings of 0.5 mm. diameter, and soybean flour in an amount less than said cereal meal substantially uniformly distributed through said mixture; whereby a non-crumbly, rancidity-inhibited, rehydratable, dehydrated scrapple food product is provided.

3. A scrapple food product comprising a dehydrated mixture of comminuted meat normally subject to oxidative change, cereal meal capable of passing through a sieve having openings of 2 mm. diameter and incapable of passing through a sieve having openings of 0.5 mm. diameter, and ascorbic acid in an amount less than said cereal meal, substantially uniformly distributed through said mixture; whereby a non-crumbly, rancidity-inhibited, rehydratable, dehydrated scrapple food product is provided.

4. A scrapple food product comprising a dehydrated mixture of comminuted meat normally subject to oxidative change, cereal meal capable of passing through a sieve having openings of 2 mm. diameter, and incapable of passing through a sieve having openings of 0.5 mm. diameter, and tocopherol in an amount less than said cereal meal, substantially uniformly distributed through said mixture; whereby a non-crumbly, rancidity-inhibited, rehydratable, dehydrated scrapple food product is provided.

5. A scrapple food product comprising a dehydrated mixture of comminuted meat normally subject to oxidative change, cereal meal capable of passing through a sieve having openings of 2 mm. diameter, and incapable of passing through a sieve having openings of 0.5 mm. diameter, and a mixture of tocopherol and ascorbic acid substantially uniformly distributed through said first-named mixture in an amount less than said cereal meal; whereby a non-crumbly, rancidity-inhibited, rehydratable, dehydrated scrapple food product is provided.

6. A scrapple food product comprising a dehydrated mixture of comminuted meat normally subject to oxidative change, cereal meal capable of passing through a sieve having openings of 2 mm. diameter, and incapable of passing through a sieve having openings of 0.5 mm. diameter, and a mixture of tocopherol and soybean flour substantially uniformly distributed through said first-named mixture in an amount less than said cereal meal; whereby a non-crumbly, rancidity-inhibited, rehydratable, dehydrated scrapple food product is provided.

7. A method of making a rancidity-inhibited, non-crumbly, rehydratable, dehydrated scrapple food product, comprising substantially uniformly mixing comminuted meat normally subject to oxidative change and an anti-oxidative substance selected from soybean flour, ascorbic acid and tocopherol; adding water to said mixture; bringing said mixture to a boil; adding to the boiling mixture a cereal meal capable of passing through a sieve having openings of 2 mm. diameter and incapable of passing through a sieve having openings of 0.5 mm. diameter; heating said mixture until a thickened mass is formed, shaping the same to a predetermined form, and dehydrating the shaped product.

8. A method of making a rancidity-inhibited, non-crumbly, rehydratable, dehydrated scrapple food product, comprising substantially uniformly mixing comminuted meat normally subject to oxidative change and an anti-oxidative substance selected from soybean flour, ascorbic acid and tocopherol; adding water to said mixture; bringing said mixture to a boil; adding to the boiling mixture a cereal meal capable of passing through a sieve having openings of 2 mm. diameter and incapable of passing through a sieve having openings of 0.5 mm. diameter; heating said mixture until a thickened mass is formed, shaping the same to a predetermined form, dehydrating the shaped product, and compressing the dehydrated product at a temperature of about 120° F.

9. A method of making a rancidity-inhibited, non-crumbly, rehydratable, dehydrated scrapple food product comprising substantially uniformly mixing comminuted meat normally subject to oxidative change and an anti-oxidative substance selected from soybean flour, ascorbic acid and tocopherol, adding water to said mixture; bringing said mixture to a boil; adding to the boiling mixture a cereal meal capable of passing through a sieve having openings of 2 mm. diameter and incapable of passing through a sieve having openings of 0.5 mm. diameter; heating said mixture until a thickened mass is formed, shaping the same to a predetermined form, dehydrating the shaped product, and compressing the dehydrated product at a pressure of about 700 lbs. per square inch.

AGNES FAY MORGAN.
BETTY M. WATTS.

REFERENCES CITED

The following references are of record in the file of this patent:

UNITED STATES PATENTS

| Number | Name | Date |
|---|---|---|
| 1,088,944 | Torkelsen | Mar. 3, 1914 |
| 1,926,185 | Vogt | Sept. 12, 1933 |
| 2,029,248 | Musher | Jan. 28, 1936 |

FOREIGN PATENTS

| Number | Country | Date |
|---|---|---|
| 131,402 | Great Britain | 1919 |

OTHER REFERENCES

Lockwood, Flour Milling, Northern Pub. Co. Lts. N. Y. C., page 406. (Copy in Division 25.)
Von Loesecke, Drying & Dehydration of Foods, Reinhold Pub. Corp., N. Y. C., 1943, pages 163-164. (Copy in Division 63.)

Certificate of Correction

Patent No. 2,457,063.　　　　　　　　　　　　　　　　December 21, 1948.

AGNES FAY MORGAN ET AL.

It is hereby certified that errors appear in the printed specification of the above numbered patent requiring correction as follows:

Column 1, line 25, for the word "lamp" read *lamb*; column 3, line 36, for "properties" read *proportion*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*